US009785587B2

(12) United States Patent
Jan et al.

(10) Patent No.: US 9,785,587 B2
(45) Date of Patent: Oct. 10, 2017

(54) METHOD FOR EXECUTING, WITHIN A MULTITASKING ONBOARD SYSTEM, AN APPLICATION TIMED ACCORDING TO A PLURALITY OF DIFFERENT TIME DOMAINS INCLUDING INTERRUPTION MANAGEMENT

(71) Applicant: COMMISSARIAT A L'ENERGIE ATOMIQUE ET AUX ENERGIES ALTERNATIVES, Paris (FR)

(72) Inventors: Mathieu Jan, Savigny-sur-Orge (FR); Christophe Aussagues, Orsay (FR); Vincent David, Marcoussis (FR); Matthieu Lemerre, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 345 days.

(21) Appl. No.: 14/413,415

(22) PCT Filed: Jul. 3, 2013

(86) PCT No.: PCT/EP2013/063994
§ 371 (c)(1),
(2) Date: Jan. 7, 2015

(87) PCT Pub. No.: WO2014/009213
PCT Pub. Date: Jan. 16, 2014

(65) Prior Publication Data
US 2015/0205737 A1    Jul. 23, 2015

(30) Foreign Application Priority Data
Jul. 9, 2012 (FR) ...................................... 12 56576

(51) Int. Cl.
*G06F 13/26* (2006.01)
*G06F 13/22* (2006.01)
(Continued)

(52) U.S. Cl.
CPC ............ *G06F 13/26* (2013.01); *G06F 9/4825* (2013.01); *G06F 9/4887* (2013.01); *G06F 13/22* (2013.01); *G06F 13/4256* (2013.01)

(58) Field of Classification Search
CPC .......... G06F 13/26; G06F 13/22; G06F 13/40; G06F 1/08
See application file for complete search history.

(56) References Cited

U.S. PATENT DOCUMENTS 5,361,362 A * 11/1994 Benkeser .............. G06F 9/4881 718/102
5,481,707 A * 1/1996 Murphy, Jr. .......... G06F 9/5027 710/1

(Continued)

FOREIGN PATENT DOCUMENTS

WO    02/39277 A1    5/2002

OTHER PUBLICATIONS

International Search Report mailed Oct. 1, 2013 from Application No. PCT/EP2013/063994.
(Continued)

*Primary Examiner* — Henry Tsai
*Assistant Examiner* — Christopher a Daley
(74) *Attorney, Agent, or Firm* — Baker & Hostetler LLP

(57) ABSTRACT

A method for executing an application in a multitasking system is provided. The application is composed of at least one task for which the temporal triggering is specified in a first temporal reference frame that is asynchronous relative to the physical time, called first external clock domain, defined by a synchronous basic clock with changes of state
(Continued)

of a peripheral device of the system. The method comprises a set of steps executed by the system upon reception of an occurrence of an interrupt in order to render the execution of the task deterministic or quasi-deterministic.

10 Claims, 4 Drawing Sheets

(51) Int. Cl.
G06F 9/48 (2006.01)
G06F 13/42 (2006.01)
G06F 13/40 (2006.01)

(56) References Cited

U.S. PATENT DOCUMENTS

| | | | |
|---|---|---|---|
| 6,983,393 B2 * | 1/2006 | Truchard | H04L 67/12 702/108 |
| 7,299,383 B2 | 11/2007 | David et al. | |
| 9,128,752 B2 * | 9/2015 | Aussagues | G06F 9/3851 |
| 2004/0117685 A1 * | 6/2004 | Truchard | H04L 67/12 713/502 |
| 2009/0006689 A1 * | 1/2009 | Lubbers | G06F 3/061 710/112 |
| 2010/0088706 A1 * | 4/2010 | Dong | G06F 9/4887 718/103 |

OTHER PUBLICATIONS

Matthieu Lemerre et al.: "Method and Tools for Mixed-Criticality Real-Time Applications within PharOS", Object/Component/Service-Oriented Real-Time Distribugted Computing Workshops (ISORCW), 2011 14th IEEE International Symposium On, IEEE, Mar. 28, 2011 (Mar. 28, 2011), pp. 41-48, XP031943770, DOI: 10.1109/ISORCW.2011.15; ISBN 978-1-4577-0303-4; the whole document.

Arkadeb Ghosal et al.: "Event-driven Programming with Logical Execution Times", University of Carlifornia, Berkeley; Proc. of HSCC 2004, Lecture Notes in Computer Science.

Jeffrey C. Mogul et al.: "Eliminating Receive Livelock in an Interrupt-Driven Kernal", Digital Corporation Western Research Laboratory; ACM Transactions on Computer Systems, vol. 15, No. 3, Aug. 1997, pp. 217-252.

* cited by examiner

METHOD FOR EXECUTING, WITHIN A MULTITASKING ONBOARD SYSTEM, AN APPLICATION TIMED ACCORDING TO A PLURALITY OF DIFFERENT TIME DOMAINS INCLUDING INTERRUPTION MANAGEMENT

CROSS-REFERENCE TO RELATED APPLICATIONS

This application is a National Stage of International patent application PCT/EP2013/063994, filed on Jul. 3, 2013, which claims priority to foreign French patent application No. FR 1256576, filed on Jul. 9, 2012, the disclosures of which are incorporated by reference in their entirety.

FIELD OF THE INVENTION

The present invention relates to the field of embedded systems supporting applications for which compliance with the real time constraints of the environment and compliance with performance levels are critical. Such systems communicate with peripheral devices to produce inputs/outputs for which the times of the changes of states have to be taken into account to ensure real-time communication between the system and its physical environment. To facilitate the demonstration of the compliance with the requirements of such applications, these real-time embedded systems aim for a deterministic execution and are consequently designed using methods that ensure the guarantee by design that the properties defined at the design stage will be observed in the executables that are generated. The use of a time-triggered programming approach forms part of these design techniques.

BACKGROUND

In a time-triggered design approach, the recognition of the changes of state of a peripheral device is generally produced through a so-called polling method. One such method consists in defining a task which observes, at successive time intervals, regular or not, the state of a peripheral device and reacts accordingly by activating the corresponding functional processing operations, for example, controlling an actuator on the basis of the data received by the peripheral device.

By construction, in such an approach, there is a delay between a change of state of the peripheral device and the execution of the associated task responsible for observing this change. For example, for a periodic task, this delay is equal, at best, to one times the period of the task. To be able to reduce this delay and therefore increase the responsiveness of the system, a polling approach entails increasing the frequency of activation of the task associated with the management of the state of a peripheral device. This causes the load of the processor on which this task is executed to be increased, and causes this task to be executed on each of its activation loops with no guarantee that a useful operating processing operation will be executed and to overload the application code of this polling management, making it dependent to the underlying system implementation. Furthermore, when a number of polling loops are necessary in the design of a system in order to manage a plurality of peripheral devices, the load problems described previously are increased because of the multiplicity of the necessary execution contexts.

A polling approach therefore induces an increase in the processor power necessary to execute a system. This increase in the load of the processor constitutes the main problem with the use of the polling approach in a time-triggered system and is an obstacle to the reduction of the costs of the systems implemented with this approach.

There now follows a more detailed description of the different technical sub-problems, not resolved when the polling approach is used and targeted by the invention, and the limitations of the prior art with respect to these different sub-problems.

In a time-triggered approach, the temporal constraints of the tasks to be executed are specified in the design of the applications. To be able to specify these temporal constraints relative to a physical time, one possibility is to use instants included in physical clocks. These clocks make it possible to specify activation and termination dates or task deadlines thus defining the triggering, that is to say a series of events described in a physical time base. The interleaving of these tasks can be represented in the form of a series of time intervals, the end of one time interval, and therefore the start of the next interval, corresponding to a date of activation of at least one task.

A time-triggered system defines a single clock domain hereinafter called physical clock domain for which the source interrupt or so-called triggering interrupt is generated by a hardware component, such as a quartz crystal oscillator, making it possible to define the physical time of the real time system. A first technical problem arises when there is a desire to specify, in the physical clock domain, the temporal behavior of tasks as a function of the changes of state of a peripheral device. In effect, the changes of state of the peripheral devices are asynchronous relative to physical clocks and it is therefore not possible to specify their temporal behavior directly in the physical clock domain, that is to say as a function of the internal clock of the main processor. Thus, the use of a polling approach does not make it possible to specify the temporal behavior of a task as a function of the changes of state of a peripheral device. A delay is always present between a change of state and a task activation date.

A set of tasks triggered by the occurrence of an external event defines a clock domain that is asynchronous relative to the physical time, for which the source interrupt originates from the peripheral device linking the system to the outside world. Such an asynchronous clock domain is, hereinafter in the description, called external clock domain. At a given instant, a task is assigned to a single physical, or external, clock domain and an application may be made up of a plurality of clock domains. The existence of different clock domains is present for example in the applications of the type servo controlling the variable speed of a toothed wheel (physical and angular external clock domains, linked to the position of the toothed wheel) or of the type of capture of the value of electrical signals (sampling physical and external clock domains, linked to the measurement of electrical values) and guides the design of some of these applications.

The international patent application WO 2002/39277 is known, which only allows for the implementation of a so-called polling approach for the management of the changes of state of a peripheral device, leading by construction to the presence of a delay between the event and its recognition by the system. Moreover, this patent application does not therefore allow for the design and execution of applications that need to incorporate processing operations whose temporal behavior is specified according to different clock domains including an interrupt management.

Also known is the American patent application US 2004/0117685 which relates to a method for taking charge of asynchronous events in a time-triggered system. This method uses a polling mechanism for the management of asynchronous events and processes these events only in time intervals, executed periodically, which can be defined statically in the design of the applications or allocated to the execution if an asynchronous event is detected. However, even in the latter case, the new allocation of the execution time intervals takes effect only at the end of the current execution period. The instants of changes of state of a peripheral device are not therefore used to specify activation dates and task deadlines and there is therefore a delay between a change of state of a peripheral device and the detection of this change of state, inducing a unnecessary processor load as already explained above.

The publication "Arkadeb Ghosal and Thomas A. Henzinger and Christoph M. Kirsch and Marco A. A. Sanvido, Event-driven programming with logical execution times, Proc. of HSCC 2004, Lecture Notes in Computer Science" also describes a system incorporating asynchronous events in an time-triggered approach. Task activation can be triggered on such asynchronous events, but the termination of a task is always expressed in physical time. Moreover, in this approach, there is still a delay between the occurrence of an event and its recognition because of the need to await the termination of the instances of the (periodic) tasks currently being executed. Thus, the problem of specifying the triggering, that is to say both the activation and the termination of tasks on the basis of asynchronous events relative to the physical time is not resolved by these works.

A second sub-problem of a polling approach lies in the lack of responsiveness to the instant of real execution of the processing operations linked to an interrupt originating from an external clock domain.

If the frequency of activation of a task is not compatible with the cost of the changes of context of execution of this task or/and there is a need for responsiveness to the instant of real execution of the event-linked processing operations (without a concept of deadline), a polling approach is not possible. An interrupt-based mode of operation is then necessary, a technique that is well known to those skilled in the art, making it possible to trigger processing operations following the occurrence of an interrupt.

The international patent application of the applicant published under the number WO 2002/39277 provides a solution to the abovementioned problem through a control of the interleaving of the tasks executed, but is still not applicable if the cost of changing one or more execution contexts is not compatible with the constraint of responsiveness with respect to the processing operations to be executed.

The prior art is rich on the use of mechanisms which make it possible to switch over from a polling-based operation to an interrupt-based operation based on the processor load but these different methods do not target the field of real-time systems. The publication by Jeffrey C. Mogul and K. K. Ramakrishnan, "Eliminating Receive Livelock in an Interrupt-Driven Kernel", ACM Transactions on Computer Systems, volume 15, number 3, pages 217-252, 1997, is, for example, known.

The method described in the American patent application US 2004/0117685 allows for the production of a response, following the detection of an asynchronous event, at a precise instant, but, for this, relies on particular hardware that makes it possible to delay the transmission of the response. In effect, no guarantee can be provided as to the fact that the asynchronous response event will have to be executed without a time interval dedicated to the management of asynchronous events. Moreover, the method described is comparable to the known concept of "polling server" and "bandwidth-preserving server" in the real-time systems, but which does not make it possible to execute a processing operation at a precise instant, only to minimize a delay between the occurrence of an event and the execution of the functional code linked to that event.

A third sub-problem targeted by the invention relates to the communication between different tasks which are triggered according to different clock domains.

An application can be made up of tasks belonging to different clock domains and a task of one domain may want to communicate with a task of another domain and/or await an event that might be outside of its clock domain. Such events notably include:

events associated with instants expressed using other clock domains, for example an instant expressed in angular clock mode for a task for which the clock is in real time, or, conversely, an instant in real time for a task for which the clock is in angular time. For example, it may concern the sending of data by a task to another clock domain, or, for a task of a physical clock domain, the occurrence of the next interrupt of an external clock domain;

asynchronous events, for example the arrival of an interrupt triggered by the activation of an indicator control by the driver of a car, even if these events are not associated with any clock of a clock domain;

SUMMARY OF THE INVENTION

The present invention proposes a method that makes it possible to design an application triggered by a plurality of clock domains (physical and/or external) and incorporating, for each domain, interrupt-driven processing operations in a real-time system. In particular, the invention allows for the exchange of data and the synchronization between the processing operations triggered in different clock domains, while retaining the execution of deterministic or quasi-deterministic multitasking real-time systems. The term "deterministic" is here associated with a reproducible behavior of the system which is not sensitive to the random variables of execution times or to the specific operation of the schedulers. The term "quasi-deterministic execution" is used due to the drifts, potentially different from one execution to another, between the different clock domains managed by one and the same processor. When a single clock domain is used, the execution is then deterministic.

More specifically, a "quasi-deterministic execution" means, in the context of the invention, a deterministic execution in each clock domain taken separately for which the worst temporal behaviors and the associated sizing of the computation load are predictable and bounded within each clock domain, the sizing of the buffers for the implementation of the communications between and within clock domains are predictable and bounded and, finally, the data observed of a clock domain from another clock domain are mutually consistent. More specifically, a datum of a first domain, observable by a first task of a second domain, will also be observable by any other task of the second domain whose activation date is equal to or greater than the activation date of the first task (of the second domain). A datum of a first domain, not observable by a first task of the second domain, will be also non-observable by any other task of the second domain whose activation date is prior to the activation date of the first task (of the second domain).

To obtain this property of quasi-determinism, the method according to the invention relies on the occurrences of the authorized interrupts of the system to, ultimately, either update the scheduling lists and thus make it possible to specify the temporal behavior of tasks as a function of changes of state of a peripheral device, or immediately execute a first part of a functional processing operation in order to meet responsiveness constraints associated with these processing operations, the second part of the functional processing operation being able to be executed subsequently.

Moreover, any deviation at runtime from the assumptions that were made, for each domain, with regard to the sizing of the computation load, is detected by the present method via verification that the occurrences of the events triggering the domains is in accordance with the expected behavior (and taken as assumption for the sizing of the computation load) and that the occurrence constraints over an interval are observed for the interrupts triggering the execution of processing operations.

Finally, the recognition of timing differences between the data-producing tasks and the data-consuming tasks makes it possible to size the buffers used for the implementation of intra-domain communication. The conversion of dates between domains makes it possible to obtain this capability for the inter-domain communications.

It should also be noted that, when the application requires only a single clock domain, its execution using the method according to the invention can be made deterministic because the issue associated with the clock drifts between distinct domains no longer exists.

The subject of the invention is a method, deterministic or quasi-deterministic, for executing an application in a multitasking system, characterized in that said application is composed of at least one task for which the temporal triggering is specified in a first temporal reference frame that is asynchronous relative to the physical time, called first external clock domain, defined by a synchronous basic clock with changes of state of a peripheral device of said system, said method comprising at least the following steps executed by said system upon reception of an occurrence of an interrupt:
  checking whether the interrupt received is authorized by the system,
  time-stamping the received interrupt,
  checking that the instant of occurrence of the interrupt conforms to the specified occurrence constraints and, if not, informing the application thereof,
  if the received interrupt is synchronous with the basic clock of said first external clock domain, in other words if it is a source interrupt of the first external clock domain:
    incrementing a counter of occurrences of the received interrupts, the current value of said occurrence counter corresponding to the current time in the external clock domain,
    identifying the tasks currently being executed for which the deadline is equal to the current value of the counter of occurrences of the received interrupts, signifying a deadline violation,
    transferring the tasks for which the activation date is equal to the current value of the counter of occurrences of the received interrupts, from the list of idle tasks to the list of tasks ready for execution on said system,
  if said multitasking system comprises at least one interrupt-based processing operation and the received interrupt is either asynchronous with the basic clock of said first external clock domain, or asynchronous with the source interrupts of a physical clock domain, on reception of said asynchronous interrupt, marking (309) the phase of processing of the received interrupt as executable and rendering the data necessary for said application visible within said first external clock domain,
  acknowledging the received interrupt and authorizing the reception of new interrupts.

The constraints specified on the occurrence of the interrupt can be an expected instant, in physical time, of occurrence of the interrupt and a tolerance interval on this instant.

According to a particular aspect of the invention, the tolerance interval is set or is a function of a variable whose semantic is linked to the application.

According to another particular aspect of the invention, the step of checking of the constraints specified on the occurrence of a source interrupt of the clock domain comprises at least the following sub-steps:
  checking that the interrupt is not received before the lower limit of the tolerance interval,
  checking that an interrupt is received after the lower limit of the tolerance interval and before the upper limit of the tolerance interval.

According to a particular embodiment, the method according to the invention further comprises a step of extraction of the data supplied by a peripheral device for which a change of state has triggered the interrupt.

The constraints specified on the occurrence of the interrupt can be a number of interrupts authorized over a time interval of given duration.

In a variant embodiment of the invention, the method according to the invention further comprises the following step: when a consuming task triggered according to a first clock domain wants to consult data produced by a producing task triggered according to a second clock domain distinct from the first clock domain, converting the date of activation of said consuming task into the second clock domain of the producing task, so as deduce therefrom the data that can be consulted by the consuming task which are those for which the date of visibility is less than or equal to this converted activation date.

In a variant embodiment of the invention, the method according to the invention further comprises a step of synchronization of a task on an event triggered according to a second clock domain different from said first external clock domain, the synchronization step consisting in at least:
  signaling that the task wants to await the occurrence of said event to continue its execution,
  when this event occurs, continuing the execution of the task either within said first external clock domain, or by changing the triggering of this task from said first external clock domain to said second clock domain.

Another subject of the invention is a computer program comprising instructions for the execution of the method for managing interrupts according to the invention, when the program is run by a processor and a processor-readable storage medium on which is stored a program comprising instructions for the execution of the method according to the invention.

BRIEF DESCRIPTION OF THE DRAWINGS

Other features and advantages of the present invention will become more apparent on reading the following description in relation to the attached drawings which represent.

DETAILED DESCRIPTION

Figure 1:
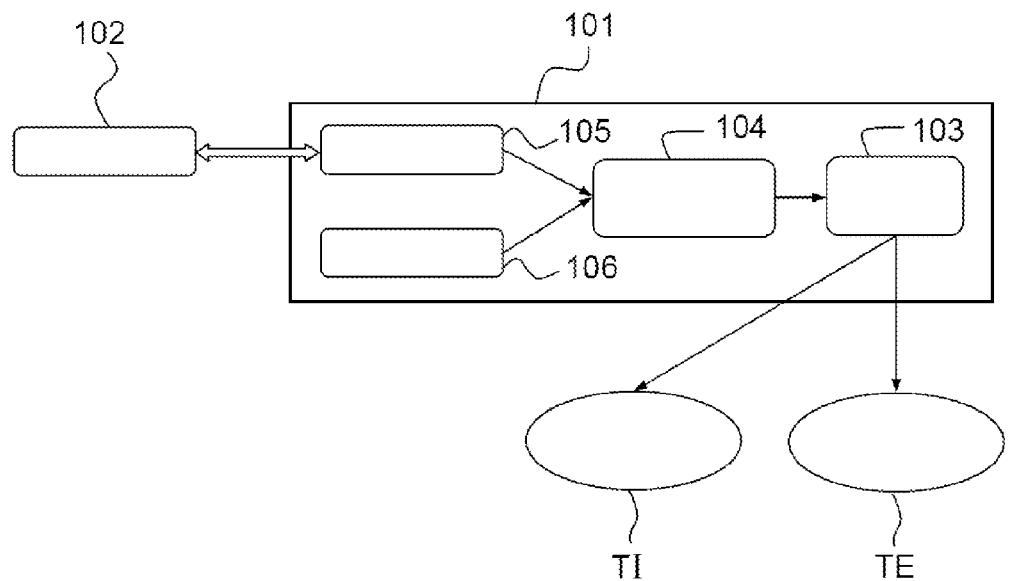
FIG. 1, a diagram of an example of a system suitable for implementing the method according to the invention, FIG. 2, a diagram illustrating the sequence of execution or the triggering of real-time tasks belonging to two different clock domains, FIG. 3, a flow diagram illustrating the steps of the method according to the invention, FIG. 4, a diagram illustrating the processing operations implemented, in a particular embodiment of the method according to the invention, following the reception of an interrupt outside of a clock domain, FIG. 5, a diagram illustrating the triggering of an interrupt at a future instant, according to a particular embodiment of the invention, FIG. 6, a diagram illustrating, on an example, the implementation of the method according to the invention.

FIG. 1 schematically represents an exemplary real-time system 101 executing different tasks, the tasks executed belonging to different clock domains.

The system 101, for example an embedded system, comprises at least one processor 103 suitable for executing at least one task belonging to an application and one interrupt controller 104 responsible for the management of the interrupt signals originating on the one hand from a clock component 106 internal to the system 101 and, on the other hand, from a peripheral device 105, for example a databus, which serves as interface between the system 101 and an external component 102 communicating with said system 101. The peripheral device 105 performs, for example, the sampling of the data transmitted by the external component 102 to the system 101. Another example of peripheral device 105 is, for example, a sensor which detects the presence of a mechanical part, constituting the external component 102, and which informs the system 101 of this detection.

The processor 103 executes a first set of tasks TI triggered according to a physical clock domain, that is to say whose sequence is synchronous with the clock supplied by the component 106 or a multiple of this clock. This physical clock domain corresponds to a time-triggered approach. The processor 103 also executes a second set of tasks TE triggered according to an external clock domain, that is to say whose sequence is synchronous with the interrupts from the peripheral device 105, generated following exchanges with the external component 102 communicating with the system 101.

The interrupt controller 104 handles arbitration of the interrupts received as a function of their priority levels. It enables the interrupts to be made visible for the processor 103 which executes the interrupt management method mentioned in a time-triggered approach as will be developed hereinbelow in the description.

Figure 2:
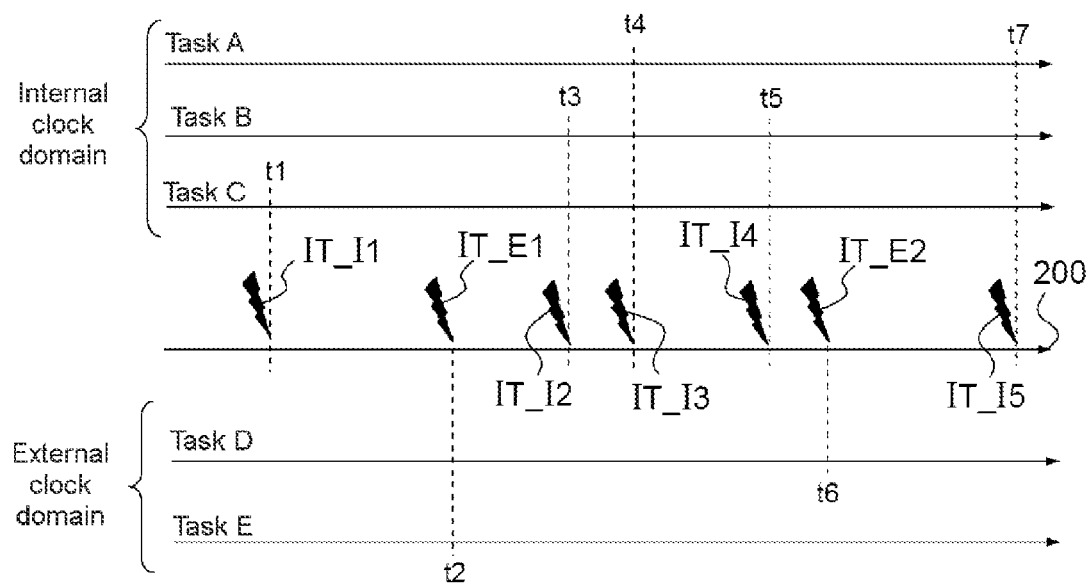

FIG. 2 illustrates, in a diagram, an exemplary sequence of the tasks executed on the processor 103 according to whether they belong to a physical or external clock domain.

In FIG. 2, the first set of tasks TI triggered by the physical clock domain consists of the tasks A, B and C. The second set of tasks TE triggered according to the external clock domain, linked to the peripheral device 102, consists of the tasks D and E.

The time axis 200 shows the instants of occurrence of the interrupts received by the interrupt controller 104. Two types of interrupts are distinguished. The interrupts IT_I1, IT_I2, IT_I3 and IT_I4 are from the clock component 106 internal to the system 101 and are therefore associated with the physical clock domain. The interrupts IT_E1 and IT_E2 are from the databus 105 and are associated with the external clock domain linked to the peripheral device 102.

FIG. 2 represents, by way of illustration, a possible exemplary sequence of the different tasks. At the instant t1, following the reception of the interrupt IT_I1 by the interrupt controller 104, the task C switches from the list of idle tasks to the list of tasks ready to be executed on the processor 103. At the instant t2, following the reception of the interrupt IT_E1 by the interrupt controller 104, the tasks D and E switch from the list of idle tasks to the list of tasks ready to be executed on the processor 103 of the system 101. At the instant t6, if the instance of the task D activated at the instant t2 is currently being executed, a deadline violation for this task D is detected.

There now follows a more detailed description of the interrupt management method according to the invention executed by the processor 103 to ensure a deterministic or quasi-deterministic execution of real-time processing operations.

In a preliminary step, a basic clock that makes it possible to define an external clock domain is specified. This basic clock describes the changes of state of a peripheral device defining the external clock domain concerned. A distinct basic clock is associated with each of the peripheral devices managed and as many external clock domains as there are peripheral devices that can ultimately be defined. In the example of FIGS. 1 and 2, the basic clock corresponds to the clock associated with the generation of the occurrences IT_E1 and IT_E2 of the interrupt signal produced by the peripheral device 105. The definition of this basic clock consists of at least two elements: an identification of the source interrupt (of which IT_E1 and IT_E2 represent occurrences) used by the input/output peripheral device and the description of the temporal behavior expected of the occurrences of changes of state of the peripheral device via, for example, the use of clocks 106 of the physical clock domain, that is to say in physical time.

An exemplary basic clock is, for example, an interrupt generated by a component of bus controller type, constituting the peripheral device 105 of the system 101, and communicating with an integrated circuit, consisting of the external component 102. This integrated circuit is responsible for measuring the values of electrical signals then transmitting, one by one, the values obtained, also called samples, via the databus linking the integrated circuit and the bus controller. During the initialization of the system, the bus controller is configured to trigger the generation of an interrupt when a sample is received. These occurrences of interrupts define a basic clock of a synchronous clock domain on the production of samples of electrical measurements.

Another exemplary clock is, for example, an interrupt generated by a component of timer type, constituting the peripheral device 105 of the system 101, and communicating with a hardware sensor, constituting the external component 102. This hardware sensor is responsible for detecting the appearance of a tooth on a toothed wheel and transmitting a signal indicating such a detection to the timer component. During the initialization of the system, the timer component is configured to trigger the generation of an interrupt when the signal indicating the detection of a tooth is received. These occurrences of interrupts define a basic clock of a synchronous clock domain on the detection of teeth on a toothed wheel, that is to say synchronized on the speed of the wheel.

Additional clocks suitable for generating a clock signal with a periodicity that is a multiple of the signal produced by the basic clock can also be defined in addition to the basic clock. In other words, an additional clock consists of a sub-set of the basic clock, that is to say the occurrences of an additional clock are taken from the occurrences of the basic clock.

Optionally, an authorized tolerance relative to the temporal behavior expected of the changes of state of the peripheral device can be specified. More specifically this tolerance can be specified by the provision of a temporal deviation authorized on the expected precise instant of the change of state of a peripheral device. In other words, this temporal deviation is specified by a minimum tolerance $t_{min}$ (worst case of the timing between two occurrences of the interrupt) and a maximum tolerance $t_{max}$ such that the change of state of the peripheral device expected at the instant T can occur within the time interval $[T-t_{min}, T+t_{max}]$.

More generally, the tolerance can be provided in the form of a set of intervals of a variable whose semantic is linked to the application system designed using the method according to the invention, in which at least the worst case (of the tolerance time interval) of the rate of occurrence of an interrupt originating from a peripheral device is specified. For example, in the case of a system for servo-controlling the variable speed of a toothed wheel, the precise instant of a change of state of a peripheral device can be variable as a function of the speed of the wheel. In this case, the temporal behavior of the changes of state of the peripheral device is defined by making the worst case value of the precise instant of the change of state, that is to say the lowest value, correspond to an interval of variation of the speed of the wheel $[V_1, V_2]$. Thus, the basic clock can be defined dynamically as a function of a value specific to the application system implemented.

A graph of the temporal behavior of the basic clock that is thus described can be extracted from this specification. An example is a periodic behavior, that can be specified via a single clock.

From the basic clock specified, and from any additional clocks, the temporal triggering of the tasks to be executed as a function of the changes of state of the peripheral device can be specified in the external clock domain thus defined.

Management of a Received Interrupt

Figure 3:
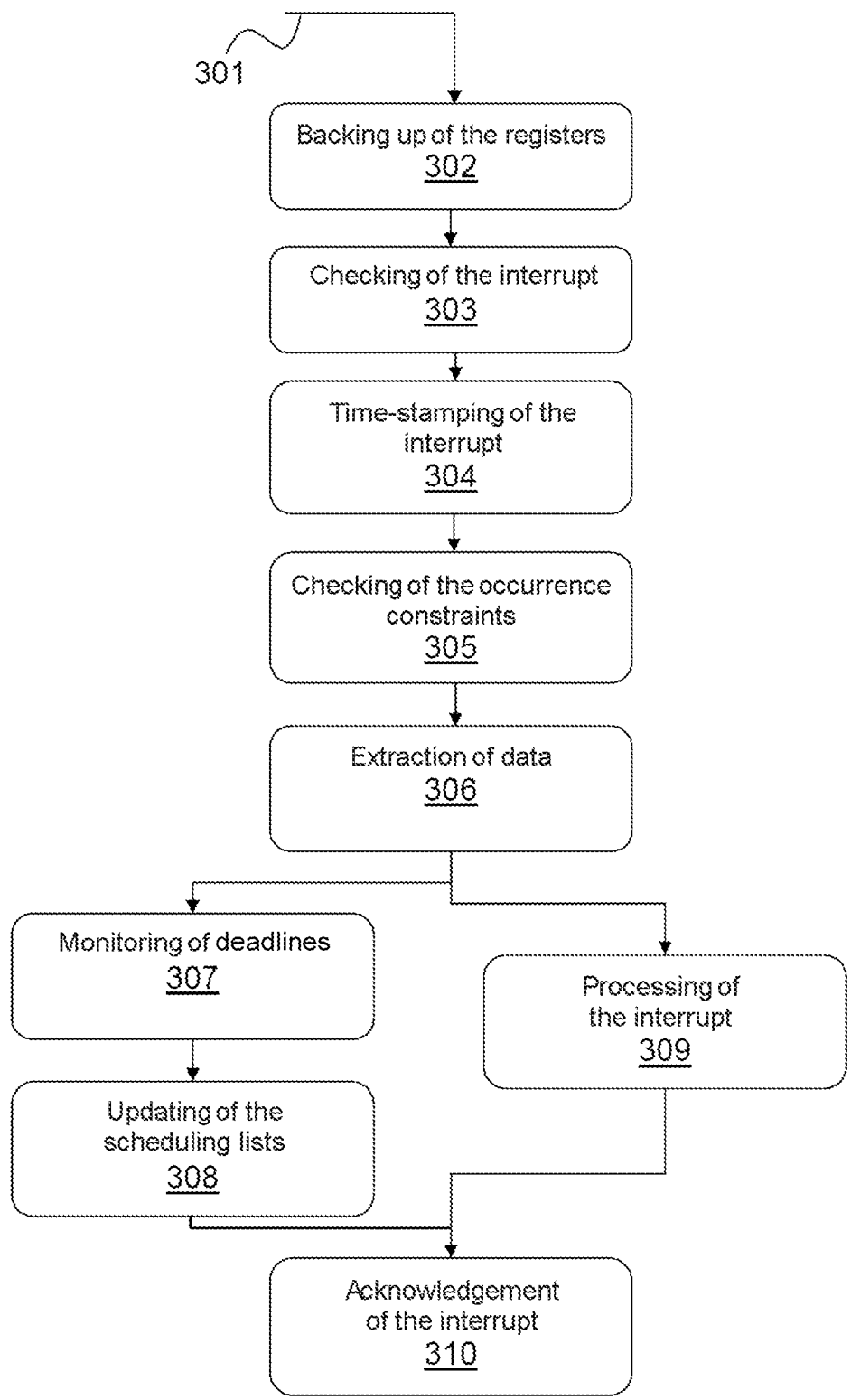

FIG. 3 illustrates, in a flow diagram, the steps of implementation of the method according to the invention, performed on the occurrence of an interrupt.

The term interrupt denotes the event associated with the transmission of an interrupt signal from a peripheral device to the processor 103, arbitrated by the interrupt controller 104. The occurrences of the received interrupts can define either a physical clock domain of the system, when they originate from a clock component 106 internal to the system, or an external clock domain, when they originate from a peripheral device 105 of the system 101.

Hereinafter in the description, two types of interrupts are distinguished. The expression "source interrupt of a clock domain" or "triggering interrupt" denotes the interrupt described by the basic clock specified in the preliminary step of the method for this clock domain. The expression "non-clock domain interrupt" denotes any other interrupt which can be linked to an event that is not synchronous with the basic clock of a clock domain.

On reception 301 of an interrupt, a source interrupt of a clock domain or a non-clock domain interrupt, in a first step 302, if the hardware architecture of the system 101 requires it, the hardware registers used to identify a previously received interrupt are backed up. These registers are notably used to time-stamp the received interrupts and control the occurrence of these interrupts according to the prior specification of their expected temporal behavior. Depending on the level of execution of the processor 103 chosen to execute the present method, the processor can offer duplicated or shared registers that make it possible to reduce, even eliminate, the necessary backups to be implemented if a processing operation was currently being executed at the time when the interrupt was received.

In a second step 303, a check is carried out to verify that the received interrupt 301 is an interrupt that is authorized by the system.

In a third step 304, the event associated with the interrupt is timestamped. This step 304 can be performed using timestamping mechanism if the peripheral device that was the source of the received interrupt offers such a mechanism. As an example, such a timestamping mechanism is implemented by a network controller implementing the IEEE 1588 standard. In the case of an implementation without timestamping hardware support, the timestamping of the event must immediately follow the preceding steps without other interrupts interfering with these system actions.

In a fourth step 305, the constraints of occurrence of the received interrupt are checked. If a constraint is not observed, the received interrupt is deactivated and the information is returned to the application level. The constraint of occurrence to be observed depends on the type of received interrupt, according to whether it is a source interrupt of a clock domain or a non-clock domain interrupt.

The source interrupts of a clock domain follow a temporal behavior defined in the specification produced in the preliminary step of the method according to the invention and which serves as entry point.

The checking of the constraints of occurrence of a source interrupt of a clock domain is performed, for example, by using the value comparison mode, well known to those skilled in the art, of the hardware counter used to implement the current time of the physical clock domain. In such a value comparison mode, a hardware counter sets an indicator and, if necessary, triggers an interrupt if the comparison value has been reached. The values compared in the method correspond to the lower and upper limits of the time interval specified for the occurrence of an interrupt, thus making it possible to monitor the minimum tolerance and the maximum tolerance for each event. The comparison values to be set are computed by adding the tolerance expected on the temporal behavior of the peripheral device to the current value of the hardware counter used to implement the current time of the physical clock domain.

To monitor the minimum tolerance, the comparison mode used is configured to only set an indicator, taking the form of a bit, when the expected value is reached. In the fourth step 305, the setting of this minimum tolerance monitoring indicator is verified. If this indicator is not set, this means that the received occurrence of the triggering interrupt is received before the lower limit of the tolerance interval. The system stores this information which is transmitted to the application in the fifth step 306 of the method, described hereinbelow.

Similarly, to monitor the maximum tolerance, the comparison mode used is configured to trigger an interrupt when the hardware counter reaches the upper limit of the specified time interval. If such an interrupt (not corresponding to the source interrupt of the monitored domain) is generated, this means that no interrupt has been received during this interval and that therefore the behavior of the system does not conform to the assumptions of the specification. In such a case, and following the reception of this interrupt, the fifth step 306 of the method is executed in order to inform the application as early as possible of the failure to observe the expected temporal behavior. In this way, the execution of the processing operations in real time is secured.

In this possible implementation, the number of clock domain source interrupts which can be controlled is a function of the number of comparison registers associated with the counter used and the number of counters available on the hardware used to produce the system.

When the received interrupt is a non-clock domain interrupt, the constraints of occurrences to be checked relate essentially to the number of interrupts authorized over a sliding time window of given duration. Within a clock domain, the different authorized interrupts, other than the source interrupts of the clock domain, can be specified by specific time intervals. In each time interval, one type of interrupts is authorized with a maximum number of occurrences. In some time intervals, no interrupt is authorized. This authorization of the interrupts by time intervals makes it possible to incorporate the impact of the interrupts in the scheduling computations of the concerned clock domain.

In a fifth step 306, the application data supplied by the peripheral device and associated with the interrupt can be extracted and stored in a predefined memory location via the call to an application code.

This application function enables the designers of applications to implement a specific application protocol used for the implementation of the management of the peripheral device. In the case where the received interrupt is a source interrupt of a clock domain, the application code is called regardless of whether the interrupt is or is not within the tolerance interval of its expected temporal behavior. Depending on the execution performance levels on the hardware target used by the system, a change of memory right is possible that makes it possible to execute the application functions in user mode with the memory rights only necessary for this execution. This application function has the following relative information available:
  if an occurrence of the source interrupt of the clock domain has taken place or if the expected temporal behavior has not been observed,
  the duration in time between two occurrences of changes of state.

This function makes it possible to implement alternatives to stopping the system by producing predefined values whose semantic is known to the tasks of the clock domain. For example, in the case of an application responsible for detecting the appearance of a tooth on a toothed wheel, the predefined value can be an identifier of the tooth associated with the source interrupt of the clock domain on which the method according to the invention is initiated. From this information, the method can synchronize the starting of the execution of a task not on the first source interrupt of the clock domain received but on a source interrupt associated with a particular tooth identifier. This application function thus makes it possible to synchronize the starting of a domain on the computation of a particular point in the system. It can also make it possible to inform the system of the stopping of one or more tasks or of the transfer of a task to another clock domain.

In the case where the received interrupt is a non-clock domain interrupt, the sole function of the application code executed is to extract the data associated with the interrupt.

In a particular embodiment of this step, a direct memory access, or DMA, method can be used to relieve the processor of the memory management operations. In the case of the use of a DMA method, a controller can be used to directly transfer the data flowing from or to the peripheral device concerned to the main memory of the system and do so without the intervention of the processor. In this case, the received interrupt can be an interrupt generated by this controller which signifies the end of the data transfers between the peripheral device and the system.

When the received interrupt is a source interrupt of a clock domain, the method according to the invention continues with the execution of a sixth step 307 of deadline monitoring and a seventh step 308 of updating of the scheduling lists.

More specifically, the step 307 consists in monitoring the deadlines of the tasks currently being executed at the moment when a source interrupt of a clock domain occurs. A counter of occurrences of the source interrupts is incremented on each source interrupt received. The current value of this counter corresponds to the current time in the clock domain concerned. The task deadlines are compared to the counter of occurrences, which makes it possible to monitor the fact that the execution conforms to the specifications of each task. If a task for which the deadline is greater than the current value of the counter of occurrences is currently being executed, a deadline violation is identified.

The step 308 consists in updating the list of tasks ready for execution by the system according to the scheduling policy implemented. The current value of the counter of occurrences of the source interrupts is compared to the dates of activation of the tasks of the list awaiting execution, and as soon as this value reaches that of an activation date, the corresponding task is added to the list of tasks ready for execution.

When the received interrupt is a non-clock domain interrupt, the method according to the invention continues with the execution of an eighth step 309 which consists in marking as executable a phase of processing of the received interrupt and then in scanning the list containing the processing phases pending to insert them into the list of the processing phases to be executed in descending order of priority and, finally, in executing, in sequence, the different elements of this list. The case of reception of a non-clock domain interrupt corresponds to the execution, by the processor, of interrupt-driven processing operations and not of tasks as is the case for the reception of source interrupts of the clock domain. The function of a processing phase is to make the data visible for the tasks executed within a clock domain with which an interrupt-driven processing operation is functionally associated. The data originate from the peripheral device associated with the interrupt and can, if necessary, be converted via the processing phase.

In the case of non-clock domain interrupts, the processing operations implemented are separated into a phase of acquisition of the interrupt which has been described above and which combines all the steps 302 to 306 followed by one or more phases of processing of the data associated with the interrupt, for example data transmitted by an external peripheral device. A processing phase may be able to be divided into sub-phases. The processing phases of the data deriving from interrupts are strung together and, on each transition to another processing phase or each repeat of a data processing phase, the list of the processing phases awaiting execution is sorted by descending order of priority. A processing phase can be interrupted by a new acquisition phase following the reception of a new occurrence of an authorized non-clock domain interrupt.

Figure 4:
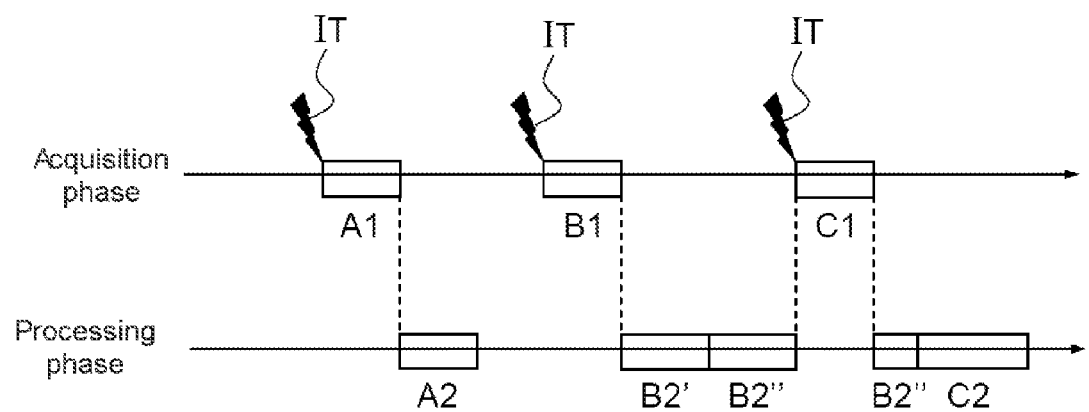

This principle is schematically described in FIG. 4. Following a first interrupt IT_1, an acquisition phase A1 followed by a data processing phase A2 are strung together. Following a second interrupt IT_2, an acquisition phase B1 is followed by a number of processing sub-phases B2' and B2". Finally, following the reception of a third interrupt IT_3 during the execution of the processing sub-phase B2", this phase is interrupted to execute a new acquisition phase C1, than is resumed when the acquisition phase C1 ends. The execution of the processing phase C2 associated with the third interrupt follows the processing sub-phase B2".

Figure 5:
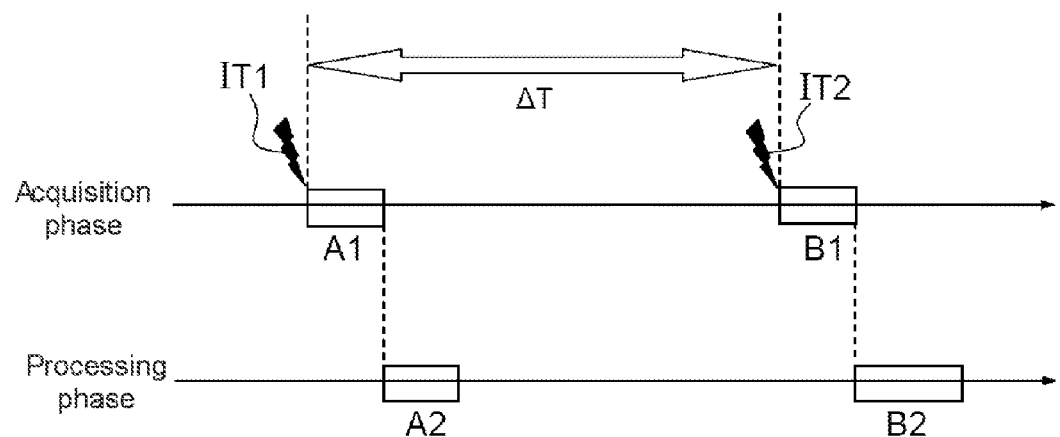

In a particular embodiment of the invention, it may be useful to allow an interrupt to be triggered at a given instant in the future to drive a peripheral device, for example to change, at precise instants, the value of an electrical signal output from a peripheral device in order to control the servo-controlling of the variable speed of a toothed wheel. If the hardware used does not allow for an injection to be triggered by hardware, a software solution requires the ability to trigger an interrupt at a precise given instant in order to toggle the state of a signal that makes it possible to give the command to the hardware to modify the state of an electronic signal used to drive the toothed wheel. FIG. 5 illustrates such a scenario in a diagram. To observe a need specific to a given application, a second interrupt IT2 has to be generated after a time delay Δt following the reception of a first interrupt IT1. The first interrupt IT1 can be a source interrupt of a clock domain or a non-clock domain interrupt. The specification of the temporal behavior of a source interrupt anticipates the need of a given number of repetitions of a pattern of interrupts, that is to say the triggering of interrupts according to a periodic pattern every time interval Δt.

To observe this specification, the method according to the invention can implement different solutions known to those skilled in the art to trigger an interrupt in the future, for example by using a clock which offers the capability to generate an interrupt when the current value of its counter is equal to a specified value or by using an additional clock to the basic clock.

In a final step 310, the received interrupt is acknowledged. The acknowledgement of an interrupt indicates the end of an acquisition phase when the received interrupt is independent of a clock domain or the end of the management of the interrupt when it is a source interrupt of a clock domain.

Processing Operations Performed Upon the Termination of a Task

When the execution of a task is terminated, the next activation of this task is computed. The computation is performed as a number of occurrences of the basic clock or of a clock derived from the basic clock of the clock domain associated with the task concerned. This number of occurrences is deduced from the time constraints specified beforehand, for example in a graph of execution of this task. The task is then removed from the list of the tasks currently being executed to be added to the list of the tasks of the clock domain that are idle.

Exemplary Implementation of the Method According to the Invention

The method according to the invention applies to any system operating according to different temporal reference frames and requiring strong responsiveness in their execution time.

An example of such a system is a system combining tasks whose temporal triggering is described on the basis of a physical time scale with tasks whose temporal triggering is described on the basis of a temporal reference frame associated with the occurrence of particular interrupts generated, for example, by a peripheral device communicating with the system and/or observing particular events external to the system. These tasks must, moreover, exchange data and also each execute processing operations at particular instants relative to their temporal reference frame. Finally, when the interrupts no longer occur, an alternative temporal and functional behavior of the tasks linked normally to this reference frame is specified on the basis of the temporal reference frame in physical time. The hardware architecture of the system implementing the method according to the invention preferentially offers two execution cores.

Figure 6:
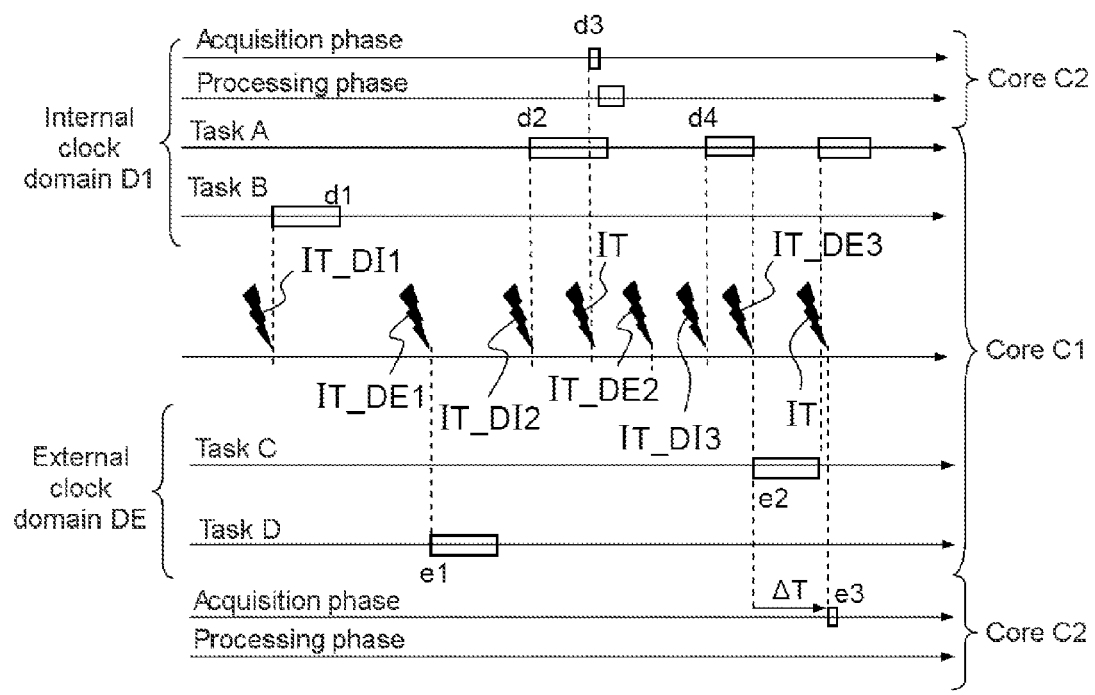

FIG. 6 illustrates, in a number of timing diagrams, the temporal triggering of the execution of two tasks A and B triggered in a first physical clock domain DI and of two tasks C and D triggered in a second external clock domain DE.

At the instant d1, a first source interrupt IT_DI1 of the physical clock domain DI triggers the execution of an instance of the task B. At the instant e1, a first source interrupt IT_DE1 of the external clock domain DE triggers the execution of an instance of the task D. At the instant d2, a second source interrupt IT_DI2 of the physical clock domain DI triggers the execution of a instance of the task A. At the instant d3, an interrupt IT_X, independent of the two clock domains DI and DE, occurs, provoking a phase of acquisition of this interrupt followed by a phase of processing of the associated data. Preferentially, these two phases are executed on a processing core C2 different from the main processing core C1 on which the tasks triggered on the basis of the source interrupts of the two clock domains DI and DE are executed. At the instant d4, a third interrupt IT_DI3 of the physical clock domain DI triggers the execution of an instance of the task A. This instance is interrupted when an interrupt IT_DE3 of the external clock domain DE occurs, triggering the execution, at the instant e2, of an instance of the task C. The task C preempts the task A because its deadline is prior to that of the task A. When the execution of the task C is terminated, the task A is terminated in its turn. Finally, at an instant e3, an interrupt IT_Y independent of the two clock domains DI and DE is provoked at an instant Δt to be counted from the last source interrupt IT_DE3 of the clock domain DE. This interrupt IT_Y is provoked by the system to change the state of an electrical signal at a computed precise instant to be counted from the occurrence of a source interrupt. This interrupt IT_Y requires only an acquisition phase, preferentially executed on the second processing core C2 of the system, and no data processing phase.

Communications Between Tasks Triggered According to Different Clock Domains

There now follows a description of a variant embodiment of the invention which relates to the communication between tasks triggered according to different clock domains.

The communication between two tasks occurs when a first consuming task seeks to consult data generated by a second producing task. To ensure that the data consulted by the consuming task are coherent, the date of visibility of the data, that is to say the date on which the producing task makes these data visible, must be less than or equal to the activation date of the consuming task.

When the consuming task and the producing task belong to two different clock domains, the problem of observance of the abovementioned constraint arises. In effect, because of the potential drifts between the clocks of the two distinct clock domains, it is difficult to accurately know the date of visibility of data produced by a task belonging to a first clock domain from a second clock domain in which the task consuming these data is executed.

In order to resolve the abovementioned technical problem, in a variant embodiment, the method according to the invention makes it possible to ensure a coherent communication between two tasks of different clock domains. To ensure that the date of visibility of the data to be consulted is always less than or equal to the date of activation of the task consuming these data, the method according to a variant of the invention consists in implementing the following steps.

In a variant embodiment of the step 308, when the date of activation of a consuming task is reached by the counter of occurrences of source interrupts of the clock domain of this task, the correspondences between this date of activation and the current times of the other clock domains are stored. The date of activation of the consuming task converted into the clock domain of the task producing the data to be consulted is thus obtained. Based on this converted date, the data that can be consulted are deduced therefrom, as those for which the date of visibility is less than or equal to this converted activation date.

The conversion of the activation date into another clock domain is produced by recording the value of the source interrupt occurrences counter of this other clock domain at the instant of occurrence of this activation date.

In another variant embodiment of the invention, a task is synchronized on an event triggered according to a different clock domain. For this, a task signals that it wants to await an event to continue its execution, then, when this event occurs, this task continues its execution, possibly in another clock domain.

To produce this synchronization, a task has to signify that it wants to be synchronized on an event via a system call to the Kernel by supplying at least the expected event and, possibly, a tolerance interval on the instant of occurrence of the event (as described in the preliminary step of the method) as well as the description of the expected temporal behavior in the case where a change of clock domain is desired. The processing of the system call by the Kernel consists in verifying whether the event has not already occurred. If the event has already occurred, the task continues its execution in its clock domain. Otherwise, the task awaits the occurrence of the event. These steps constitute preliminary steps specific to this variant of the method described previously. To implement the wait for the occurrence of the specified event, a number of implementations are possible.

For example, the use of a so-called polling technique at the system level, well known to those skilled in the art, can be used to make it possible to pool the monitoring of conditions deriving from a number of tasks. Moreover, with this technique, a task is loaded only if the specified event on which the task must be synchronized has occurred.

Another possible implementation consists in using a specific interrupt to inform the system that the event awaited by the task has occurred. In this implementation, the first four steps of the method described previously in support of FIG. 3 are executed, the third and fourth steps 304, 305 being optional and executed only if a tolerance interval on the instant of occurrence of the expected event was specified in the prior system call. The fifth step 306 of calling to an application function is not executed. The method according to the invention continues with the execution of a seventh step 308 of updating of the scheduling lists, by placing the task in the queue of the idle tasks of a clock domain to be executed from the next instant of the clock.

Independently of the chosen implementation, when the task is resumed, it can continue its execution in its clock domain or switch over to a temporal behavior described on the basis of another clock domain, specified in the system call in the step prior to this variant of the method.

The nature of the event initiating synchronization of a task and the execution of the task following this event can cover different scenarios.

For example, the event can be a condition on the values of an input peripheral device. Depending on the condition and the possibilities offered by the hardware, it is possible to produce different synchronizations.

The event concerned can be an interrupt generated when a new value communicated by the input peripheral device is available. In this case, the task is synchronized on this event according to the value received.

The method for managing interrupts in an approach triggered by a plurality of time domains can be implemented as a computer program comprising instructions for its execution on a processor. Such a computer program can be stored on a processor-readable storage medium.

The invention claimed is:

1. A computer-implemented method, deterministic or quasi-deterministic, for executing an application in a multitasking system, said application being composed of at least one task for which a temporal triggering is specified in a first temporal reference frame that is asynchronous relative to a physical time, being a first external clock domain, defined by a synchronous basic clock with changes of state of a peripheral device of said system, said method comprising at least the following steps executed by said system upon reception of an occurrence of an interrupt:
   checking whether the interrupt received is authorized by the system,
   timestamping the received interrupt,
   checking that the instant of occurrence of the interrupt conforms to specified occurrence constraints and, if not, informing the application thereof,
   if the received interrupt is synchronous with the basic clock of said first external clock domain, in other words if it is a source interrupt of the first external clock domain:
      incrementing a counter of occurrences of the received interrupts, a current value of said occurrence counter corresponding to a current time in the external clock domain,
      identifying the tasks currently being executed for which a deadline is equal to the current value of the counter of occurrences of the received interrupts, signifying a deadline violation,
      transferring the tasks for which an activation date is equal to the current value of the counter of occurrences of the received interrupts, from a list of idle tasks to a list of tasks ready for execution on said system,
   if said multitasking system comprises at least one interrupt-based processing operation and the received interrupt is either asynchronous with the basic clock of said first external clock domain, or asynchronous with the source interrupts of a physical clock domain, on reception of said asynchronous interrupt, marking a phase of processing of the received interrupt as executable and rendering data necessary for said application visible within said first external clock domain, and
   acknowledging the received interrupt and authorizing a reception of new interrupts.

2. The method of claim 1, in which the constraints specified on the occurrence of the interrupt are: an expected instant, in physical time, of occurrence of the interrupt and a tolerance interval on said instant.

3. The method of claim 2, in which the tolerance interval is set or is a function of a variable whose semantic is linked to the application.

4. The method of claim 1, in which the step of checking of the constraints specified on the occurrence of a source interrupt of the clock domain comprises at least the following sub-steps:
   checking that the interrupt is not received before a lower limit of the tolerance interval,
   checking that an interrupt is received after the lower limit of the tolerance interval and before an upper limit of the tolerance interval.

5. The method of claim 1, further comprising a step of extraction of the data supplied by a peripheral device for which a change of state has triggered the interrupt.

6. The method of claim 1, in which the constraints specified on the occurrence of the interrupt are a number of interrupts authorized over a time interval of given duration.

7. The method of claim 1, further comprising the following step: when a consuming task triggered according to a first clock domain wants to consult data produced by a producing task triggered according to a second clock domain distinct from the first clock domain, converting the date of activation of said consuming task into the second clock domain of the producing task, so as to deduce therefrom the data that can be consulted by the consuming task which are those for which a date of visibility is less than or equal to this converted activation date.

8. The method of claim 1, further comprising a step of synchronization of a task on an event triggered according to a second clock domain different from said first external clock domain, the synchronization step comprising:
   signaling that the task wants to await the occurrence of said event to continue its execution,
   when this event occurs, continuing the execution of the task either within said first external clock domain, or by changing the triggering of this task from said first external clock domain to said second clock domain.

9. A computer program comprising instructions stored on a tangible non-transitory storage medium for executing on a processor a method, deterministic or quasi-deterministic, for executing an application in a multitasking system, said application being composed of at least one task for which a temporal triggering is specified in a first temporal reference frame that is asynchronous relative to a physical time, being a first external clock domain, defined by a synchronous basic clock with changes of state of a peripheral device of said system, said method comprising at least the following steps executed by said system upon reception of an occurrence of an interrupt:
   checking whether the interrupt received is authorized by the system,
   timestamping the received interrupt,
   checking that the instant of occurrence of the interrupt conforms to specified occurrence constraints and, if not, informing the application thereof,
   if the received interrupt is synchronous with the basic clock of said first external clock domain, in other words if it is a source interrupt of the first external clock domain:
   incrementing a counter of occurrences of the received interrupts, a current value of said occurrence counter corresponding to a current time in the external clock domain,
   identifying the tasks currently being executed for which a deadline is equal to the current value of the counter of occurrences of the received interrupts, signifying a deadline violation,
   transferring the tasks for which an activation date is equal to the current value of the counter of occurrences of the received interrupts, from a list of idle tasks to a list of tasks ready for execution on said system,
   if said multitasking system comprises at least one interrupt-based processing operation and the received interrupt is either asynchronous with the basic clock of said first external clock domain, or asynchronous with the source interrupts of a physical clock domain, on reception of said asynchronous interrupt, marking a phase of processing of the received interrupt as executable and rendering the data necessary for said application visible within said first external clock domain, and
   acknowledging the received interrupt and authorizing a reception of new interrupts.

10. A tangible non-transitory processor-readable recording medium on which is recorded a program comprising instructions for executing a method, deterministic or quasi-deterministic, for executing an application in a multitasking system, said application being composed of at least one task for which a temporal triggering is specified in a first temporal reference frame that is asynchronous relative to a physical time, being a first external clock domain, defined by a synchronous basic clock with changes of state of a peripheral device of said system, said method comprising at least the following steps executed by said system upon reception of an occurrence of an interrupt:
   checking whether the interrupt received is authorized by the system,
   timestamping the received interrupt,
   checking that the instant of occurrence of the interrupt conforms to specified occurrence constraints and, if not, informing the application thereof,
   if the received interrupt is synchronous with the basic clock of said first external clock domain, in other words if it is a source interrupt of the first external clock domain:
   incrementing a counter of occurrences of the received interrupts, a current value of said occurrence counter corresponding to a current time in the external clock domain,
   identifying the tasks currently being executed for which a deadline is equal to the current value of the counter of occurrences of the received interrupts, signifying a deadline violation,
   transferring the tasks for which an activation date is equal to the current value of the counter of occurrences of the received interrupts, from a list of idle tasks to a list of tasks ready for execution on said system,
   if said multitasking system comprises at least one interrupt-based processing operation and the received interrupt is either asynchronous with the basic clock of said first external clock domain, or asynchronous with the source interrupts of a physical clock domain, on reception of said asynchronous interrupt, marking a phase of processing of the received interrupt as executable and rendering the data necessary for said application visible within said first external clock domain, and
acknowledging the received interrupt and authorizing a reception of new interrupts.

* * * * *